United States Patent [19]
Atchley

[11] Patent Number: 5,191,876
[45] Date of Patent: Mar. 9, 1993

[54] ROTATABLE SOLAR COLLECTION SYSTEM

[76] Inventor: Curtis L. Atchley, 7531 Oriental Trail, San Antonio, Tex. 78244

[21] Appl. No.: 845,620

[22] Filed: Mar. 4, 1992

[51] Int. Cl.⁵ ............................................. F24J 2/38
[52] U.S. Cl. ................................. 126/576; 126/586; 126/690
[58] Field of Search ................ 126/438, 439, 425, 422

[56] References Cited

U.S. PATENT DOCUMENTS

| | | | |
|---|---|---|---|
| 3,305,686 | 2/1967 | Carter et al. | 126/425 |
| 4,127,926 | 12/1978 | White | 29/453 |
| 4,146,785 | 3/1979 | Neale | 126/425 |
| 4,179,612 | 12/1979 | Smith | 126/425 |
| 4,184,482 | 1/1980 | Cohen | 126/438 |
| 4,235,222 | 11/1980 | Ionescu | 126/438 |
| 4,240,406 | 12/1980 | Hutchison | 126/438 |
| 4,313,426 | 2/1982 | Niedermeyer | 126/438 |
| 4,325,359 | 4/1982 | Fries | 126/438 |
| 4,325,360 | 4/1982 | Kelley | 126/438 |
| 4,326,502 | 4/1982 | Radenkovic | 126/439 |
| 4,396,008 | 8/1983 | van Kuijk | 126/438 |
| 4,469,938 | 9/1984 | Cohen | 126/425 |
| 4,475,537 | 10/1984 | Rogers et al. | 126/438 |
| 4,515,149 | 5/1985 | Sgroi et al. | 126/442 |
| 4,611,575 | 9/1986 | Powell | 126/438 |
| 4,649,900 | 3/1987 | Trihey | 126/425 |
| 4,716,882 | 1/1988 | Ishida | 126/441 |
| 4,815,444 | 3/1989 | Holland | 126/438 |

FOREIGN PATENT DOCUMENTS 63-286634 11/1988 Japan .
63-306341 12/1988 Japan .
1-291023 11/1989 Japan .

Primary Examiner—Carroll B. Dority
Attorney, Agent, or Firm—Gunn, Lee & Miller

[57] ABSTRACT

Applicant's invention is a lightweight solar collection system, supported overhead, having a parabolic reflecting trough which continuously rotates about a fluid-filled collection conduit located at the trough's focal point. The system is supported overhead preventing bending of the collection conduit, ensuring that solar rays reflected off the trough will continuously focus on the conduit. A tracking system, cooperating with the reflection assembly, monitors the location of the sun, cuing the motor when rotation of the trough is required for maximum heat collection. The efficiency acquired through a reflection assembly supported and braced overhead used in cooperation with a system monitoring movement of the sun, allows solar heat collection for operation of a cooling and heating unit simply and economically.

8 Claims, 5 Drawing Sheets

ROTATABLE SOLAR COLLECTION SYSTEM

BACKGROUND OF THE INVENTION

1. Field of The Invention

The present invention relates generally to solar energy collecting systems.

2. Background Information

Well known for years, the long-term exposure of a material to solar rays causes significant temperature increases in the material's surface and interior. Captured in a material's surface and interior, this heat can be converted and used as an energy source for heating the material's host facility or structure. In a time of diminishing natural resources and rising energy costs and environmental concerns, actual use of solar energy, a virtually inexhaustible resource, through collecting or conversion systems promises an economical, efficient, limitless and environmentally safe energy alternative.

Initially, in an attempt to capture such heat energy from solar rays, collecting systems employed large flat surface materials conducive to the absorption and storage of heat. For unobstructed exposure to solar rays, these surface materials were typically positioned and secured on top of buildings or facilities where the captured heat could be used immediately or stored for future use.

These planar energy absorbing units however create structural loading problems. The weight of each unit proves significant, severely overloading the bracing and support systems of most existing structures. Not originally designed for this excess dead load, the structure typically requires additional reinforcing and major renovations.

Situated on top of the existing structure, these relatively complex systems require a high level of maintenance. Exposed to exterior elements and foul weather often causes damage and malfunction to these systems. Lightning, hail, heavy rains, and wind storms all prove treacherous to these roof mounted systems. Additionally, the relatively complex design of such a system, including its interaction and quantity of heat transfer and storage components, as well as its required structural support network, compel a high level of attention and maintenance.

Although these flat energy absorbing surfaces provide an enormous area for the absorption of solar rays, solar heat does not concentrate on any one given area. This lack of convergence subsequently leads to a high rate of heat loss in the transfer of heat back to the atmosphere and lower circulating fluid temperatures This loss of heat prohibits the production of sufficient energy for economical operation of an air conditioning absorption heating system.

Improvements within the solar energy field introduced the reflection of solar rays onto smaller surfaces, intensely concentrating and focusing the solar rays for more efficient heating. The parabola, when used as the reflective surface, directs reflected rays through one point or focal zone. If positioned correctly in relation to the sun, all rays may pass through a predetermined point or linear zone within the inner area of the parabolic reflective surface.

Responding to these solar energy discoveries and improvements, the market introduced various stationary parabolic reflective troughs which, supported from below, typically mount to the outer surface of a structure's roof. Solar rays reflect off the surface of the entire length of the parabolic trough, reflecting onto a hated fluid-filled conduit which lies along the trough's focal point. The fluid flowing through this conduit is then available for immediate use or storage.

Although this stationary parabolic reflective trough system operates efficiently and effectively when the sun's position causes solar rays to reflect off the trough precisely onto the conduit, constant movement of the sun prohibits continuous maximum reflection. Without maximum reflection and heating, this trough system is unable to provide sufficient temperatures for economic operation of an air conditioning absorption and heating system unit. This inability subsequently places ulterior cooling demands on the structure, requiring use of the reflective system in combination with a standard air conditioning unit. This requirement then proceeds to diminish and erase any monetary advantages predicted for utilization of a reflective trough system.

In addition to creating structural loading problems similar to those created flat energy absorbing panels these stationary parabolic troughs usually demand an even more extensive support system. In addition to its standard elements, the structure must support one or more storage tanks used for the accumulation of heat produced during periods with low energy needs. These storage tanks are required for these systems since production of energy continues through intervals with no energy demands. The tanks, which must sufficiently hold the excess energy produced in the heat absorbing fluid are normally heavy as well as large. This extra weight may require additional support and bracing over and above that required for energy absorbing panels.

The sun's movement, causing continuous change in the area of maximum solar ray concentration, motivated the design of a rotatable parabolic trough, allowing for adjustment in the trough's angle toward the sun. These rotatable troughs, however, were bulky, heavy, and expensive, causing extended loads to the host structure's roof, an unwavering requirement for bottom bracing, support, and mounting, and a monetarily unrealistic energy alternative.

Although the rotatable trough poses structural loading problems similar to the reflective plates and the stationary trough, its bottom bracing, support, and mounting requirements present additional efficiency concerns. Spanning the length of the trough, the fluid-filled conduit typically bows or bends slightly under its own weight. This bowing or bending subsequently causes the conduit to fall outside the parabolic trough's focal zone, preventing reflected solar rays from striking the conduit with maximum efficiency. Conduits operating with stationary reflective troughs, also supported and braced from below, exhibit the same tendency but fail to cause the same level of concern because of the lower efficiency demands and expectations.

In order for the user to recover costs, including the costs for materials, installation, structural bracing, and existing energy system adaptation, the solar collecting rotatable trough must exhibit continuous maximum reflective and collection capabilities. Without this capability, potential users not only face the chore of renovating the intended host structure and adapting the existing energy system, but additionally face the likely possibility that purchase and operation of the solar collecting system will only result in continual monetary loss.

U.S. Pat. No. 4,611,575 teaches a parabolic trough reflector centered around an elongated receiver, the reflected rays concentrating on the receiver. Supported and braced from below, the invention provides an axis about which rotation of the trough may occur. The invention, however, does not teach a method or means for providing continuous solar ray concentration. Additionally, support and bracing from below prevents maximum reflective and collection capabilities.

U S. Pat. No. 4,325,360 teaches a parabolic reflective trough with an absorber pipe along the center of the reflective trough. This absorber pipe acts as support and as an axis for the concrete trough. Sealing of the absorber pipe to the each end of the stationary trough, however, prohibits rotation. As typical with most earlier solar collecting system designs, the cost of the materials alone is prohibitive when considering the system as an energy alternative.

In an effort to utilize the slightly less expensive stationary trough, U.S. Pat. No. 4,396,008 teaches the use of several connecting troughs positioned at different angles. Acting as a sub-collector designed to collect heat during two associated sub-periods of the day, each trough has a primary and secondary heating tube connected in series. Although more efficient than a single stationary trough, such a bulky system still requires support and bracing from below, decreasing the system's maximum reflection capabilities. In addition, the multitude of required materials still leads to a costly and complex collection system.

BRIEF SUMMARY OF THE INVENTION

It is an object of Applicant's invention to provide a solar collection system which, by incorporating lightweight materials and a cooperative design and construction method, enables use of an overhead support scheme.

It is another object of Applicant's invention to provide a lightweight automatically tracking solar collection system which, by incorporating an overhead support scheme, permits the employment of a single collection trough design thereby eliminating the need for redundant tracking and adjustment mechanisms.

Another object of Applicant's invention is to provide a lightweight automatically tracking solar collection system which, by use of an overhead support scheme, prevents deflection of the heat energy receiver and collector conduit, thereby allowing continuous maximum solar ray concentration.

It is another object of Applicant's invention to provide a lightweight automatically tracking solar collection system which, by incorporation of an elementary structural design with standard materials, enables the economical adaptation, both electrically and structurally, of this system with the existing energy unit as well as the host structure.

It is another object of Applicant's invention to provide a lightweight automatically tracking solar collection system which, by maintaining continuous maximum solar ray concentration, produces sufficient solar heat for the operation of both an air conditioning and a heating unit.

It is also an object of Applicant's invention to provide a lightweight automatically tracking solar collection system which monitors the fluid temperature within the collector conduit, engaging the tracking motor and rotating the reflective trough into a non-reflective position at specified temperatures.

It is also an object of Applicant's invention to provide a lightweight automatically tracking solar collection system which, by incorporation of a secondary power supply, ensures safe operation and energy production upon malfunction or failure of the primary power supply.

The preferred embodiment of applicant's invention is a lightweight solar energy collection system which efficiently reflects and concentrates solar rays onto a solar heat collection conduit. Overhead support of the reflecting trough and collection conduit enable continuous and precise focus of the solar rays, the collection conduit being braced in a manner that prevents bending and subsequent imprecision. Connected to the reflection assembly is a tracking system which, acting in response to movement of the sun, regulates the power flow to a motor which is connected to a rotatable shaft. This motor driven shaft, located beneath and connected to the reflecting trough, turns, rotating the reflecting trough about the solar heat collection conduit ensuring constant precise reflection of solar rays onto the conduit. Protecting against excess, unneeded energy as well as extreme temperatures within the collection conduit, a monitor switch is attached to the outflow section of the collection conduit. When required, the switch activates the motor which in turn drives the reflecting trough to a downward non-reflecting position, completing a solar energy collection system which is at all times safe as well as efficient.

DETAILED DESCRIPTION OF THE INVENTION

Figure 1:
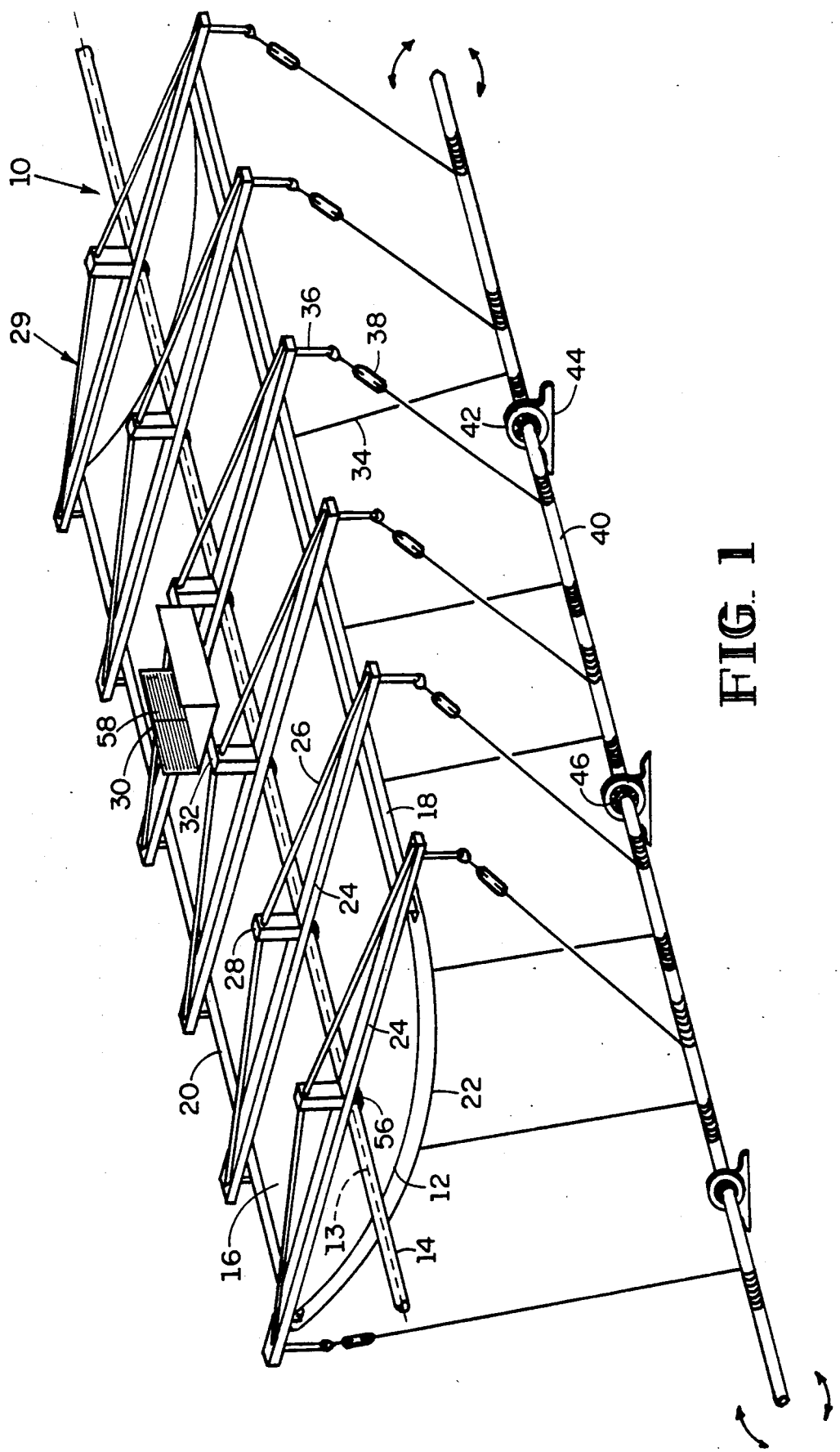
FIG. 1 is a schematic perspective view of an assembled solar heat absorbing reflection system.

Referring to FIG. 1, the solar heat absorbing reflection system (10) is shown as it will appear when assembled to facilitate balanced rotation. Solar rays, reflected off the lightweight parabolic reflective trough (12), concentrate on the fluid-filled collection tube (14) located along the trough's focal axis (13). Initially formed by wedging the longitudinal edges of trough's (12) thin reflective surface (16) into the upper longitudinal channels (18) of two longitudinal channel bars (20), the trough's parabolic shape is maintained by its own internal tensile strength and by plurality of transverse parabolic braces (22). These braces (22) are spaced approximately every two feet and are positioned on the underside of the reflective trough (12) with their ends secured to the longitudinal channels.

A second set of channel or hollow square support bars (24), attached perpendicularly across and above the collection tube (14), hence above the reflective side of the trough (16), extend beyond either edge of the reflective trough (12).

The support bars (24) are reinforced by truss rods (26) which connect each end of support bars (24) and pass through an upstanding center post (28) welded to each support bar (24). The support bar (24), truss rods (26), and post (28) thus form a tribar truss support assembly (29) for the reflective trough (12).

As shown in FIG. 1, a tray (30) attaches to a beam (32) resting between two support (28). Positioning of this tray (30) allows solar cells (58), to be mounted on the inside of each vertical wall directly above the tube (14). The tray (30) may be placed between support bars (28) at any point along the reflective trough (12) provided the tray (30) is centered directly above the collection tube (14).

Referring again to FIG. 1 threaded rods (36) are rigidly secured in depending relation to each end of support bars (24). Preferably rods (36) constitute the ends of truss rods (26) as shown in FIG. 3, and nuts (102) effect securement of each truss rod to the ends of support bars (24). Taut steel cables (34) attach to the threaded circular bar (36), facilitating balanced rotation of the reflective trough (12) around the collection tube (14). Turnbuckles (38) allow for adjustment of the cable tension such that equivalent tension exists in each cable (34), a taut condition is maintained, and twisting or warping of the reflector trough (12) about the collection tube (14) is prevented. These taut cables (34) wrap opposingly around a hardened rotating shaft (40) which is preferably constructed of steel or other material capable of withstanding wear from the cables (34). This rotating shaft (40) is secured to the floor or structural member by circular casings (42) and attached mounting flanges (44). Ball bearings (46) i placed between the rotating shaft (40) and outer circular casings (42) ensure smooth and consistent rotation of the shaft (40) As the shaft (40) is turned by a motor (12) (FIG. 2), the taut steel cables (34) rotate the reflective trough (12) about its focal axis (13) of the collection tube (14), providing continuous concentration and focus of the solar rays onto collection table (14).

Figures 2, 2A:
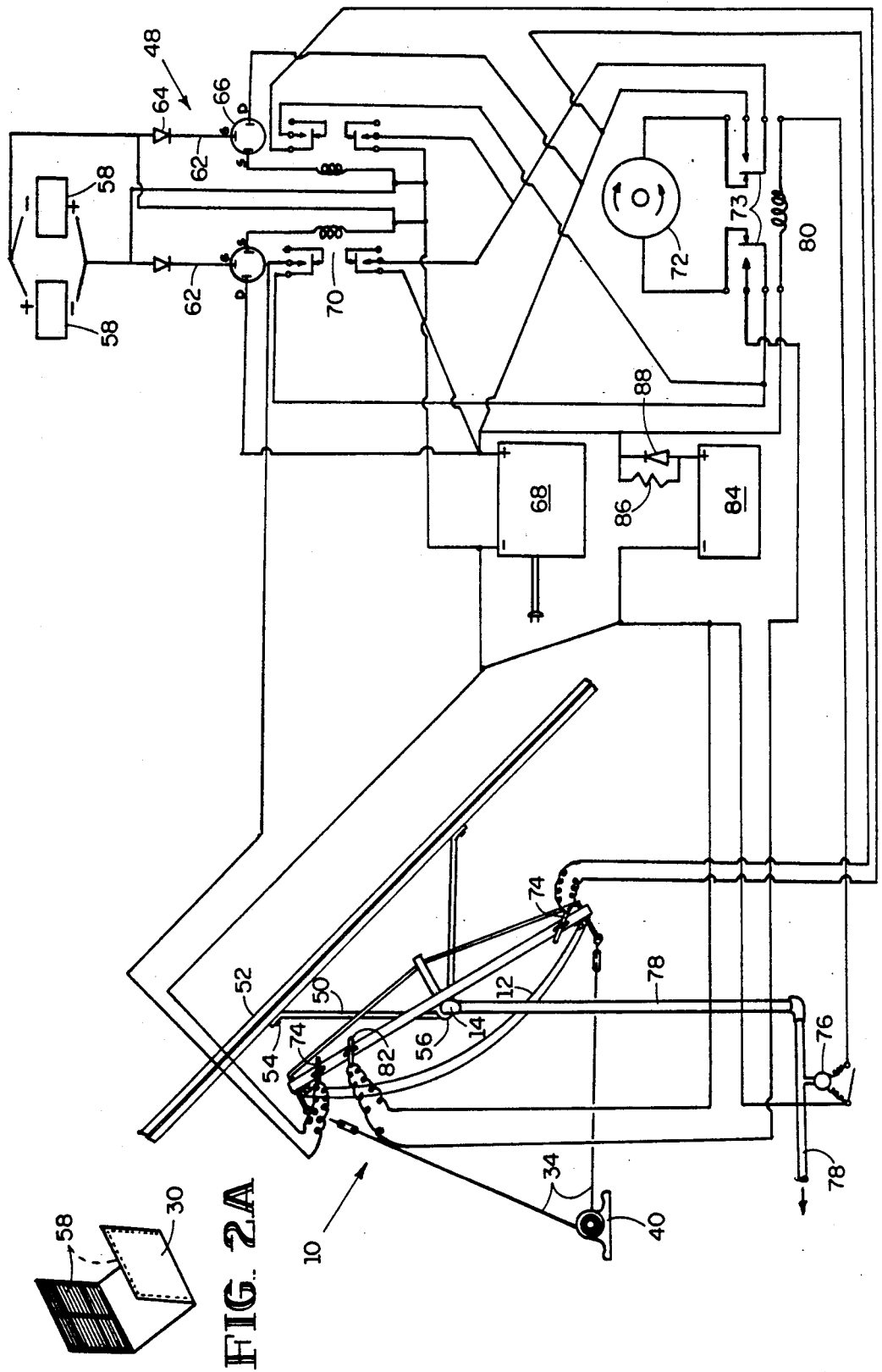
FIG. 2 is a side view of the rotation system with a schematic diagram of the solar tracking system.
FIG. 2A is a perspective view of the solar direction detecting apparatus.
Figure 3:
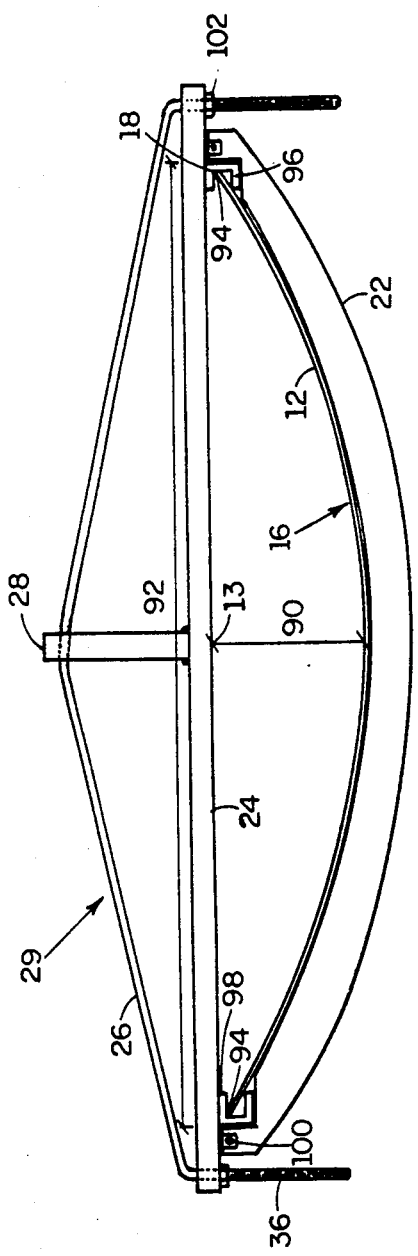
FIG. 3 is a side view, of the reflective trough, bracing and tri-bar load support assembly.

FIG. 2 provides a side view of the reflection system (10) and a schematic view of the tracking system (48). Unlike other rotation systems, the light weight of the reflective trough (12) and accompanying rotation system (10) enables overhead support of the reflection system (10) by the trusses (29), hence by collection table (14). The collection tube (14) rests in the vertices of the L-shaped overhead supports (50), connecting to an overhead structure (52) by standard bolts or welds (54). Ball bearings (56), capable of withstanding the high levels of heat encountered from the collection tube (14), facilitate rotation or movement of the support trusses 29, hence the trough (12) around the collection tube (14).

A tracking system (48) (FIG. 2), in cooperation with the reflection system (10), maintains the highest possible level of solar ray reflection and concentration on the fluid-filled collection tube (14). Monitoring the reflection on the collection tube (14), two solar cells (58) placed in a tray (30) (shown in FIGS. 1 and 2 1) on each of two vertical sides facing inward and centered directly above the collection tube (14), receive solar rays in the same manner and direction as the collection tube (14). When equivalent light reaches the cells (58), there is direct concentration and focus of solar rays on the collection tube (14), hence providing the most efficient solar collecting system. At this point, the cells (58), which are opposingly connected as shown in FIG. 2, produce no net electrical charge or voltage and consequently direct no movement or rotation of the reflective trough.

Movement of the sun, however, eventually causes a contrast in the amount of light striking the cells (58), an indication that the reflected solar rays are not efficiently concentrated and focused on the collection tube (14). Therefore, when a contrast exists between the amount of solar rays striking each cell (58), the tracking system (48) (FIG. 2) is energized and the trough (12) is again by motor (12) such that equivalent amounts of solar rays strike each cell (58).

Engagement of the tracking system (48) occurs the instant differing amounts of solar rays strike each cell (58). While equivalent amounts of solar exposure to the cells (58) cause the cell's charges to cancel one another, differing amounts of solar exposure to each cell (58) cause a resulting current flow. This resulting current will travel in one of two different paths (62) within the circuit. The directional choice depends upon which cell (58) receives the greater amount of light, the factor that governs the desired direction of trough (12) rotation.

Leaving the solar cells (58) on the appropriate path (62), the current travels through one of two diodes (64) depending on the direction of current flow and enters one of two Power Metal-Oxide Semiconductor Field Effect Transistors (PWR MOSFET) (66). The small amperage of the cell's current is sufficient to trigger the gate or switch in the PWR MOSFET (66). Once triggered, the PWR MOSFET (66) allows current to flow from the DC power supply (68) such as an AC rectifier to the rest of the tracking system (48).

The PWR MOSFET (66), which is well known in the art, proves critical when placed within this unique tracking system (48). Although other transistors are sensitive and react to small currents, none are capable of subsequently handling the substantial amounts of current necessary to power this system. Additionally, filling this system's need for immediate reaction to charge required in the flow of power, the PWR MOSFET's switch release or stop current in less than four nanoseconds.

The current which the PWR MOSFET (66) releases, from the power supply (68) continues through the circuit and activates motion relay (70). This permits, the reversible DC motor (72), to receive power from either motion relay (73) and turn the shaft (40) and rotate the reflective trough (12) in either direction.

As is well known in the field, a mercury switch (74), located at each end of the reflective trough (12), prevents contact between the reflective trough (12) and overhead structure (52). Each mercury switch (74), connected within the circuit between the power supply (68) and appropriate motion relay (70), prevents power from reaching the motor (72) once the reflective trough (12) rotates to the outer limit of its safe rotational path. This outer limit of rotation corresponds to the point at which the mercury, travelling to the opposite, end of the switch casing, opens the circuit and consequently stops the power.

FIG. 2 additionally shows the tracking system (48) equipped with a high temperature override switch (76). Attached to the outflow conduit (78), the high temperature override switch (76) continuously monitors the temperature of the fluid exiting the collection tube (14). If the fluid reaches a predetermined temperature, the high temperature override switch (76) allows current to travel through the alternate motion relay (80). This motion relay (80) energizes the motor (72) which rotates the reflective trough (12) into a non-reflecting downward position. A third mercury switch (82), acting in concert with the high temperature override system, monitors the rotation, of the reflective trough (12) ensuring against contact between the trough (12) and the overhead structure (52) as the reflective trough (12) rotates into a non-reflecting position. When the fluid temperature reaches an acceptable level, the high temperature override switch (76) opens and cuts current flow and the primary tracking system reengages and rotates the trough (12) into a high efficiency reflective position.

As an additional safeguard, a battery (84) in the circuit is available for rotation of the reflecting trough (12) should the system lose power. A resistor (86) and diode (88) in parallel maintain a trickle charge across the battery (84), ensuring the availability of an alternate power source.

Referring now to FIG. 3 the reflective trough (12), trough brace (22) and tri-bar truss support assembly (29) appear in side view. The thin, lightweight reflective surface (16) is a parabola with the distance from its focal point to its vertical median (90) equal to one quarter of its horizontal width (92).

The tri-bar truss assembly (29), as previously stated, consists of a support bar (24), a post (28), and a truss rod (26).

Figure 4A:
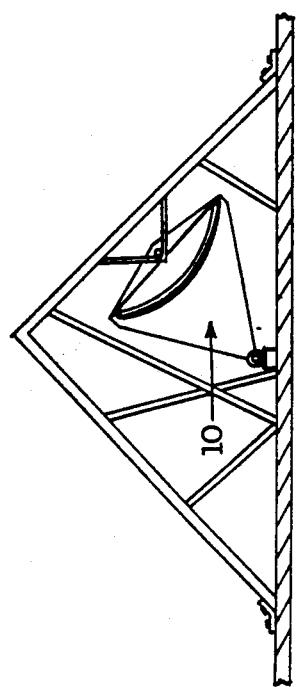
FIG. 4A is a sectional view taken on the plane A—A of FIG. 4.
Figure 4:
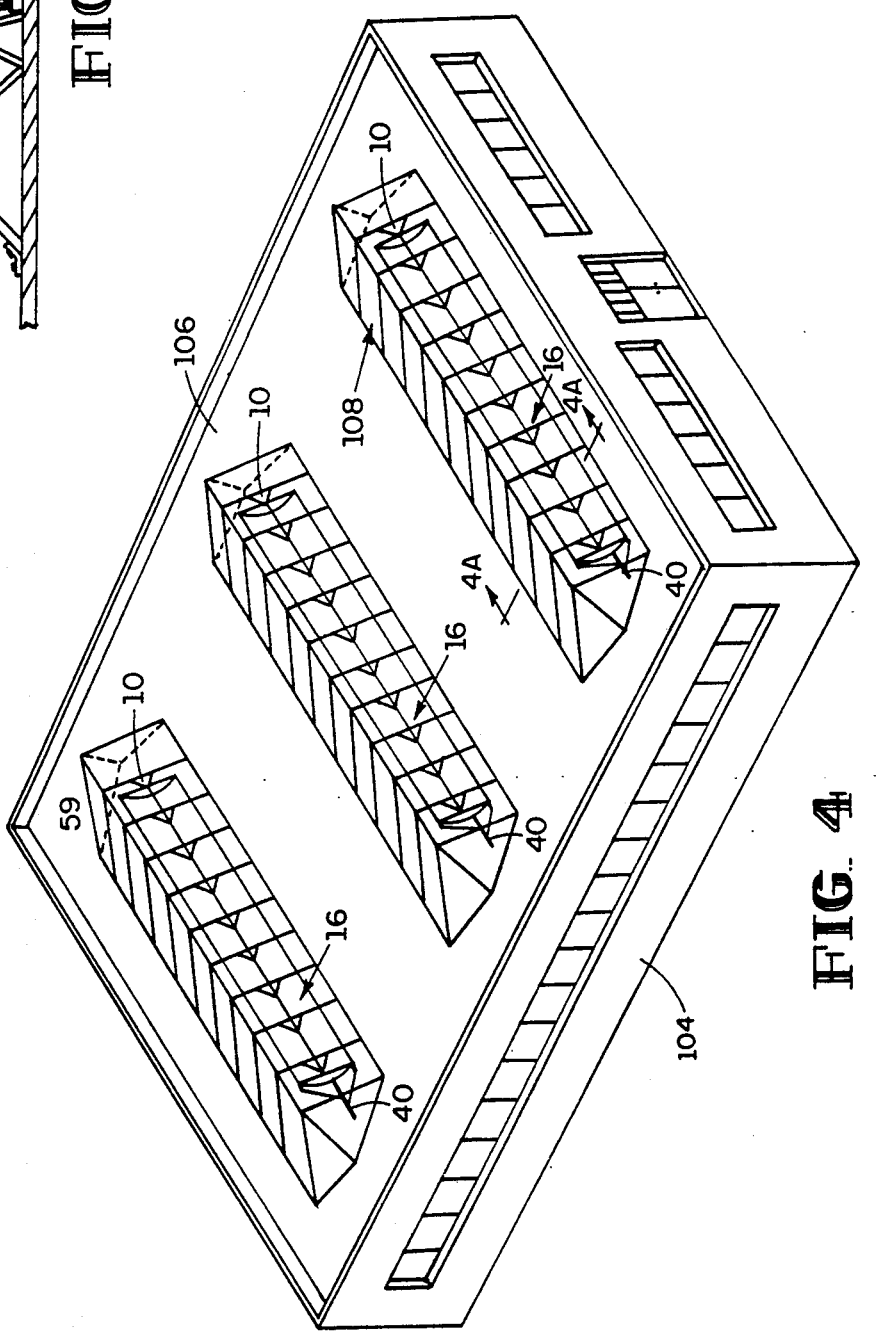
FIG. 4 is a perspective view of multiple parallel reflecting troughs positioned on the level roof of their host structure.

Referring now to FIG. 4, the preferred embodiment of applicant's invention is shown as utilized to service a larger facility (104). Reflection systems (10) are positioned on the facility's roof (106) in accordance with the square footage service capability characteristic of the particular length and size of the reflective surface (16).

Due to the spacing between troughs, solar rays reach each collection system at slightly different angles. Since precision is crucial, each collection system (59) acts independently, rotating about its accompanying individual focal axis (13).

The roof of the facility (106), as shown in FIG. 4, is level. The absence of a slanted roof and subsequent attic or storage space indicates the need for alternate means of placement and protection for the solar collection system (59). A transparent covering (108), placed over the solar collection system (59), provides a stable structure for bracing and attachment of the rotation system (10). This transparent covering (108) also provides protection for the entire system (59) from the elements since foul weather, as well as dust and dirt, all interfere with the reflective capabilities of, and may cause physical damage to, the collection system (59).

Figure 5:
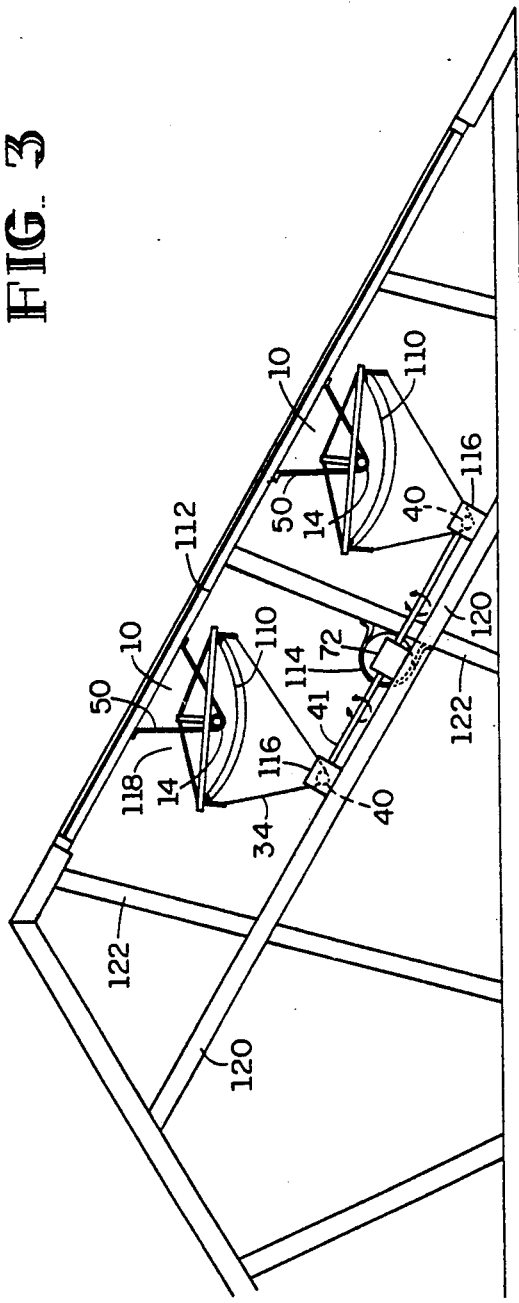
FIG. 5 is a schematic side view of a compact double-trough system driven by a single motor.

FIG. 5 illustrates a pair of smaller reflecting troughs (110) used in combination to avoid the limited rotational capacity of the larger single trough (12), shown in FIG. 2. An expanded rotational range is particularly crucial when the solar collecting system is operating under a severely slanted structure (112) as contact between a larger trough (12), as in FIG. 2, and overhead structure (112) may occur before the trough (12) is sufficiently rotated, significantly decreasing the solar collecting system's efficiency. Small reflective troughs (110) have greater rotational capacities, the potential for contact with the overhead structure (112) occurring much farther along the trough's rotational path. Cables (34) from each reflective trough (110) wrap opposingly around respective rotational shafts (40) which are, in turn, driven by single motor (72). This single motor (72), braced (114) between the collection systems (10), has the single rotational shaft (41) extending from each side of a gear box (73) driven by the motor (72) to gear 90° boxes (116) which ensure proper degrees of rotation. Operating in unison, both reflective troughs (110) rotate equivalently, ensuring the same maximum heat collection efficiency within both collection tubes (14).

Attached to the overhead structure (112) in the same manner as a single larger collection system (59) shown in FIG. 2, each of the reflective troughs (110) is supported and braced from above by L-shaped frames (50). Similarly, two smaller lightweight tri-bar truss support assemblies (118) perform the same load redistribution as and are identical to the larger single assembly (29) shown in FIG. 3.

In order to support the motor (72), 90° gear boxes (116), rotational shafts (40), reflective systems (10), and multiple bracing members (120) and (122) are required. The need for additional bracing, however, is ultimately dependent upon the structural composition of the particular serviced building. Although extremely lightweight, vertical bracing (122) is required to ensure overhead support for the dual reflective troughs (110) and provide sufficient structural strength for wind and snow loading. Similarly, the need for additional vertical bracing is also dependent upon the facility's structural composition.

Figure 6:
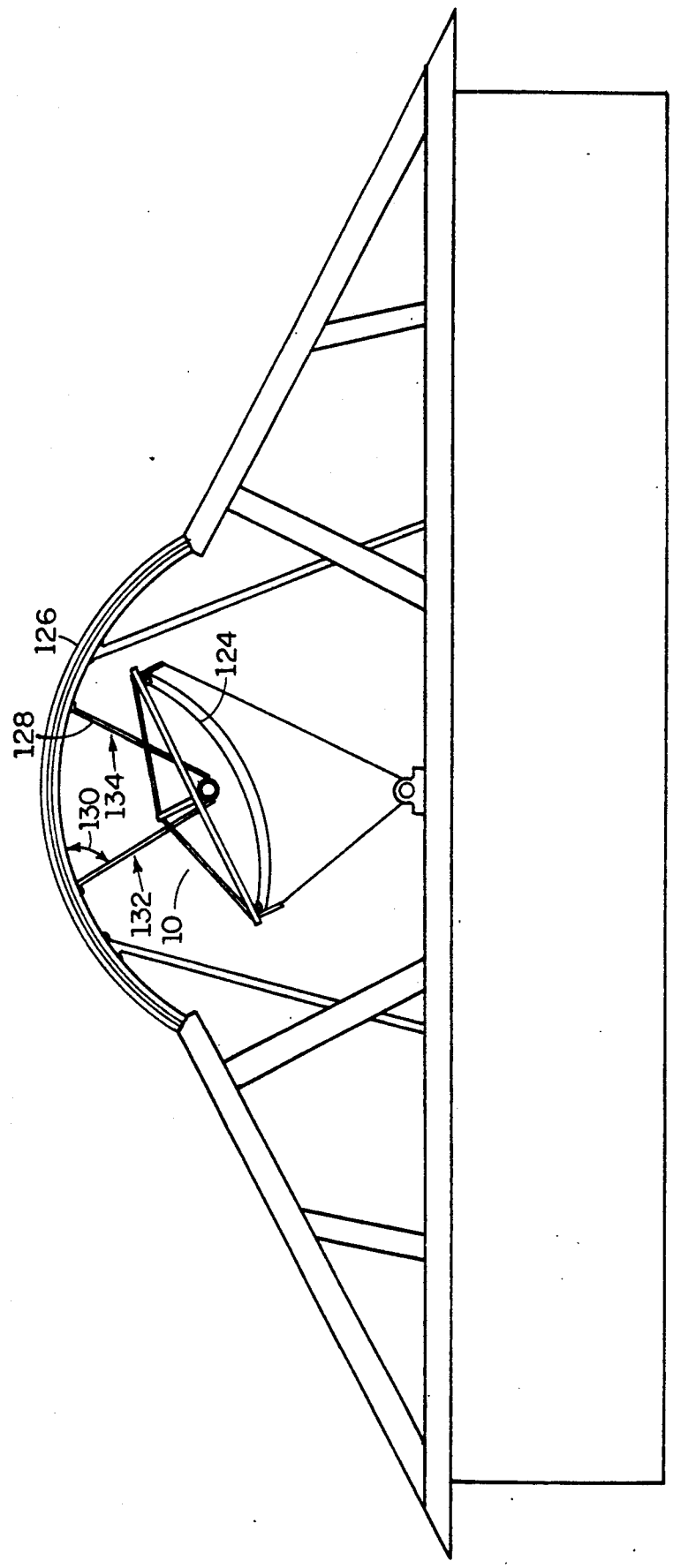
FIG. 6 is a schematic side view of a expanded range rotational reflective system positioned under and supported by a transparent dome.

Alternatively, FIG. 6 shows a larger single reflecting trough (124) positioned under a transparent dome (126). Like the standard collection system (10) shown in FIGS. 1 and 2, multiple overhead bracing (128) supports the reflection system. This bracing (128), however, unlike the standard collection system (10), connects to a transparent dome (126) which dictates different angles between each leg (132) and (134) of the brace L-shaped (128) and the transparent surface (126). The collection system shown in FIG. 6 is identical to the standard collection system (10) with the exception of rotational capability. Placing the solar collection system (59) under a transparent dome configuration (126) gives greater rotational freedom. In a tropical zone, the dome configuration (126) allows entrance of solar rays during the entire year.

I claim:

1. A solar heat collection apparatus comprising, in combination:

an elongated metallic conduit for a heat absorbing fluid;

a plurality of longitudinally spaced brackets for supporting said conduit in a position exposed to the sun;

a plurality of elongated support elements transversely disposed relative to said conduit at longitudinally spaced intervals;

bearing means on each said support element rotatably engaging said conduit;

each said support element having a parabolic surface with a focal axis substantially coincident with the axis of said conduit;

a pair of elongated frames respectively rigidly secured to the outer end portions of said elongated support elements;

a flexible rectangular sheet having at least one reflective surface;

means on said elongated frames for engaging the respective longitudinal edges of said sheet and deforming said sheet into conformity with said parabolic surfaces to define a parabolic reflective surface having focal axis coincident with the longitudinal axis of said conduit;

a motor driven shaft disposed beneath said sheet; and a plurality of cables respectively secured to all ends of said support elements by one cable end and having the other cable end wound around said shaft, each cable connected to one end of a said support element being wound on said shaft in a direction opposite to the cable connected to the other end of said support element, whereby reverse rotations of said shaft respectively effect reverse rotations of said parabolic reflective surface about said focal axis without warping of said parabolic reflective surface.

2. The apparatus of claim 1 further comprising means responsive to the incident angle of sunlight relative to said parabolic reflective surface for rotating said shaft to position said parabolic reflective surface to direct all incident sunlight onto said conduit.

3. The apparatus of claim 2 wherein said means responsive to the incident angle of sunlight comprises a pair of solar cells;

means for positioning said solar cells between said parabolic reflective surface and the source of sunlight in opposed parallel relationship to each other and said focal axis; and means responsive to the difference in photoelectric voltages respectively developed by said solar cells for rotating said motor driven shaft to equalize said photoelectric voltages, thereby disposing said parabolic reflective surface in a position to maximize the reflection of incident light onto said conduit.

4. The apparatus of claim 1 wherein said means for engaging the respective longitudinal edges of said sheet comprise opposed longitudinal channels in said elongated frames.

5. The apparatus of claim 1 further comprising a thermal switch operable to an open position in response to the temperature of said heat absorbing fluid reaching a predetermined level;

an energization circuit for said motor driven shaft; and means for incorporating said thermal switch in the energization circuit for said motor driven shaft to rotate said parabolic surface to an inoperative position relative to the sunlight.

6. The apparatus of claim 1 wherein said elongated support elements each comprises a truss;

said truss comprising an elongated bar, an upstanding post in the center of said bar and a rod passing though the upper end of said post;

said rod having its two ends bent downwardly to pass through the outer end portions of said elongated bar; and means for securing the rod ends respectively to said elongated bar ends.

7. The apparatus of claim 6 wherein said cable ends are secured to said downwardly bent portions of said rods.

8. A solar heat collecting apparatus comprising, in combination:

an elongated metallic conduit for a heat absorbing fluid;

means for rigidly supporting said conduit in a position exposed to incident sunlight;

a flexible, generally rectangular sheet of material having a reflective surface;

a frame for supporting said sheet beneath said conduit with said reflective surface exposed to the incident sunlight;

said frame comprising a pair of elongated side frame members and a plurality of sheet supporting frame elements secured in longitudinally spaced, transverse relation to said side frame members and having upwardly facing parabolic surfaces having a focal axis substantially coincident with the axis of said conduit;

means on said side frame members for detachably engaging the respective long side edges of said rectangular sheet to bend said sheet into abutting relation to said parabolic surfaces on said sheet supporting frame elements, thereby forming a parabolic reflective surface having a focal axis coincident with said axis of said conduit;

means for rotatably supporting said sheet supporting frame elements on said conduit; and means for applying a rotating torque in either direction to each of said sheet supporting frame elements, thereby rotating said sheet in either direction about said focal axis of said parabolic reflective surface without warping said sheet.

* * * * *